United States Patent Office 2,756,813
Patented July 31, 1956

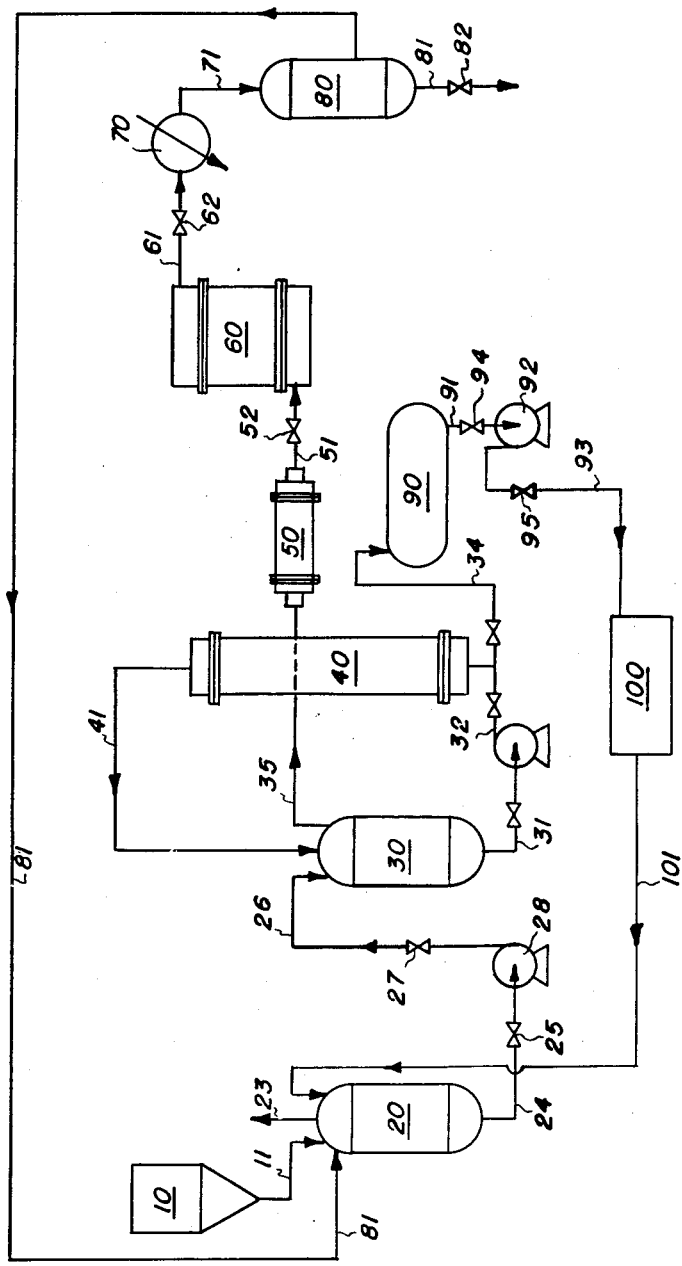

2,756,813

PROCESS OF VAPORIZING POLYCHLORO-CYCLOHEXANE COMPOUNDS

Albert P. Giraitis, David D. Humphreys, and Thomas A. Leeper, Baton Rouge, La., assignors to Ethyl Corporation, New York, N. Y., a corporation of Delaware Application February 29, 1952, Serial No. 274,112

4 Claims. (Cl. 159—47)

This invention relates to the dehydrochlorination of organic chlorine compounds, and more particularly, but not exclusively, to the dehydrochlorination of waste isomers of benzene hexachloride to form trichlorobenzene.

In the substitution chlorination of benzene, several stereometric isomers of benzene hexachloride are formed, of which only the gamma isomer is valuable for insecticidal purposes. In concentrating the gamma isomer, such as in the manufacture of lindane, up to about 90 weight percent of the "crude" benzene hexachloride product remains as "waste isomers." These waste isomers may be up-graded to produce trichlorobenzene. The latter may be used as such or employed as an intermediate in the manufacture of even more valuable products, such as 1,2,4,5-tetrachlorobenzene, 2,4,5-trichlorophenol, and 2,4,5-trichlorophenoxy-acetic acid, commonly known as 2,4,5-T.

In the dehydrochlorination step, a rapid rate of cracking and a favorable product distribution are of paramount importance. In these regards, vapor phase catalytic dehydrochlorination has been found superior to liquid phase cracking. However, vaporization of benzene hexachloride and similar polychlorocyclohexane compounds causes coking (carbon formation) of the organic material which accumulates on the walls of the reactor and fouls the catalyst. Prevaporization of the benzene hexachloride in a separate vaporizer has been successful in isolating the problem from the reactor, but has not minimized coke formation and accumulation thereof in the vaporizer. In consequence, the process equipment becomes plugged and heat transfer of the vaporizer, necessary to effect vaporization of the benzene hexachloride, is impaired. In addition, at vaporization temperatures, difficulties are encountered with precracking of the benzene hexachloride, particularly when catalytic materials, such as iron, are present in the feed stream.

Attempts have been made to employ a simple agitated pot to effect vaporization. Considerable coking and precracking is encountered, probably due to the high residence times necessary with such procedure. A tube type vaporizer positioned within a furnace is unsatisfactory and inoperative for extended periods of operation. Coke accumulates on the tube walls at a relatively high rate and the vaporizer becomes entirely unsuitable after relatively short periods of use.

It is accordingly an important object of the present invention to provide a method for vaporizing a polychlorocyclohexane compound so as to minimize coke formation and to essentially eliminate the accumulation thereof within a vaporizer.

Another object is to provide a process of the above type in which precracking of the polychlorocyclohexane is eliminated or materially reduced.

Still another object of this invention is to provide a method whereby any coke formed in the vaporization is swept from the vaporization zone and subsequently removed from the liquid polychlorocyclohexane.

Other objects and advantages of the present invention will become apparent as the description proceeds, especially when considered in connection with the accompanying drawing wherein:

The figure is a schematic flow diagram of a process embodying the features of the present invention.

Before explaining the present invention in detail, it is to be understood that the invention is not limited in its application to the process specifically described herein, since the invention is capable of other embodiments and of being practiced or carried out in various ways. Also it is to be understood that the phraseology or terminology employed herein is for the purpose of description and not of limitation.

According to the present invention, the benzene hexachloride or other polychlorocyclohexane compound is vaporized, prior to dehydrochlorination, in a continuous flow-type vaporizer, such as a tube or pipe. High velocities, sufficient to provide turbulent flow, are maintained in the vaporizer, and a high liquid to vapor ratio is also maintained. Under these conditions, coke formation is at least materially reduced, and it has been found that the small quantities of coke that do form do not deposit on the vaporizer walls, as is true when employing prior methods. In addition, it is generally desired to provide a filter, or similar means, to remove the entrained coke from the liquid benzene hexachloride so as to prevent accumulation thereof in the liquid being vaporized. In addition, it is frequently preferred to provide a means to continuously eliminate iron and other catalytic impurities from the vaporizer stream so as to eliminate precracking of the benzene hexachloride.

More specifically, the process of the present invention comprises continuously circulating a stream of liquid benzene hexachloride through a tube-type vaporizer, such as a tube bundle containing a plurality of parallel tubes, at a velocity consistent with a Reynolds number of at least 2300. The vaporization rate of the benzene hexachloride is controlled to maintain a relatively large liquid phase throughout the vaporizer, i. e., vaporization between about 0.1 percent and about 20 percent by weight. Normally, it is preferred to effect vaporization of between about one and about 10 percent of the benzene hexachloride per pass through the vaporizer.

It has been found that coke formation, and particularly coke deposition and accumulation on the walls of the vaporizer, occurs at an abnormal rate when the vapor is in direct contact with the vaporizer walls. Thus, by maintaining both turbulent flow and a high liquid to vapor ratio in the vaporizer, a liquid protecting film is maintained on the walls throughout the vaporizer. By this technique, coke formation is materially reduced and coke accumulation directly on the vaporizer walls is virtually eliminated. In addition, with flow velocities corresponding to turbulent flow, the liquid mechanically sweeps the internal vaporizer walls and carries the undesired coke out of the vaporizer.

By virtue of this high recycle of liquid to be vaporized (preferably vaporizing less than 10 percent of benzene hexachloride per pass), the residence time of the liquid in the vaporizer is materially reduced and also a means is provided for continuously removing entrained coke from the system without appreciable deposition thereof on the walls. In addition to these desired results, the vaporizer heat transfer characteristics are greatly improved.

When desired, some means may be employed to remove "tramp" iron, ferric chloride and other catalyzing impurities which tend to predehydrohalogenate the benzene hexachloride in the vaporizer unit. Such means is also highly desirable while employing a highly efficient catalyst, such as activated carbon, since iron compounds tend to coat and foul the more effective catalyst. The high recycle of benzene hexachloride through the vaporizer thus provides an extremely convenient means of removing such undesired materials. The benzene hexachloride solution, or a part thereof, for example, may be continuously passed through an iron clean-up system to maintain the iron or other catalyzing material below any desired concentration. For this purpose, the solution may be washed with hydrochloric acid, contacted with a suitable absorbent material, such as fuller's earth or other clay, or by any similar method.

As a preferred embodiment of this invention, a quantity of trichlorobenzene may be added to the benzene hexachloride or other polychlorocyclohexane, so as to reduce the melt temperature and so as to increase the degree of vaporization of the benzene hexachloride in the vaporizer. The trichlorobenzene acts as a vapor carrier and materially reduces both precracking and coking of the benzene hexachloride.

Catalysts suitable for effecting dehydrochlorination are well known and include metallic iron, ferric chloride, aluminum chloride, and similar compounds. Activated carbon has recently been found to be highly effective and is preferred in employing the present process.

With reference to the drawing and considering steady state conditions, benzene hexachloride is melted with trichlorobenzene in a melt pot 20, the trichlorobenzene being preferably obtained as a product recycle, and the liquid mixture is continuously fed into a knockout drum 30. This molten mixture is immediately heated and is continuously circulated from the knockout drum through the vaporizer 40 and back to the knockout drum where a controlled quantity of the benzene hexachloride-trichlorobenzene mixture vapor is flashed. The latter vapor fraction is then further heated in a superheater 50 and passed into a reactor 60, wherein the benzene hexachloride vapors are cracked to trichlorobenzene. The product therefrom, essentially pure trichlorobenzene, is then liquefied in condenser 70 and collected in a trichlorobenzene holdup drum 80. The liquid product may then be withdrawn therefrom as desired. A portion of the molten mixture in the knockout drum 30 is continuously circulated through a filter feed tank 90 and a coke filter 100 to remove traces of solid carbon particles formed during the heating operations.

More specifically the melt pot 20 is connected at its top with the hopper 10 and with the trichlorobenzene holdup drum 80 through lines 11 and 81 respectively. The melt pot 20 is also vented to atmosphere through line 23. The molten mixture is circulated from the bottom of the melt pot 20 to the top of the knockout drum 30 through lines 24 and 26 by means of pump 28. Valves 25 and 27 are provided in the lines 24 and 26, respectively.

The knockout drum 30 is connected at its bottom with the bottom of the vaporizer 40 through lines 31 and 33 and pump 32, and also with the filter feed tank 90 through line 34. The outlet or upper end of the vaporizer 40 is connected with the upper end of the knockout drum 30 through line 41.

The flashed vapor fraction containing benzene hexachloride and trichlorobenzene, in feed ratio, is then passed through line 35 to the superheater 50. The latter is connected through line 51 and valve 52 to the bottom of the reactor 60. Lines 61 and 71 connect the reactor 60 to the condenser 70 and the condenser to the trichlorobenzene holdup drum 80, respectively. A valve 62 is also provided in the line 61. Withdrawal of product is accomplished through line 81 and valve 82.

The filter feed tank 90 is connected through the coke filter 100 to the melt pot 20, by means of lines 91, 93 and 101 and pump 92. Valves 94 and 95 are provided in the lines 91 and 93, respectively.

The melt pot 20, knockout drum 30, trichlorobenzene holdup drum 80, and filter feed tank 90 are preferably simple cylindrical drums. If desired, the melt pot may be provided with internal agitation, and the knockout drum may be provided with insulation and/or jacketed.

The vaporizer 40, superheater 50, reactor 60, and condenser 70 are all preferably tube bundles, i. e. series of parallel tubes. The reactor tubes generally are packed with a suitable catalyst, such as activated carbon, and a screen is normally provided at the lower inlet ends of the catalyst-filled tubes.

The following is an example of one preferred mode of carrying out the process of the present invention.

The apparatus illustrated schematically in the drawing was first filled with a solution comprising essentially trichlorobenzene. The solution was continuously circulated through the system. The melt pot and vaporizer were heated externally and benzene hexachloride was gradually added to the melt pot 20 from the hopper 10 as the system approached operating temperatures. The benzene hexachloride had the following composition in percent by weight:

| | |
|---|---:|
| Alpha isomer | 77.5 |
| Beta isomer | 9.9 |
| Gamma isomer | 7.0 |
| Epsilon isomer | 1.0 |
| Heptachlorocyclohexane | 2.6 |
| Tetrachlorocyclohexene | 0.3 |

After the system attained a steady state continuous operation, the benzene hexachloride-trichlorobenzene weight feed ratio was 2:1. The benzene hexachloride was fed to the melt pot at a rate of about 10 grams per minute and the melt pot was maintained at a temperature of about 195° C. This mixture was continuously fed to the top of the knockout drum from whence the same was circulated through the vaporizer 40. The temperatures in the knockout drum and vaporizer were maintained at about 285° C. Turbulent flow is maintained through the vaporizer and approximately one percent of the benzene hexachloride was flashed per pass. The composition of the liquid circulated into the vaporizer was about 90 percent benzene hexachloride and 10 percent trichlorobenzene whereas the flashed vapor had a composition essentially the same as the feed composition—66.7 percent benzene hexachloride and 33.3 percent trichlorobenzene. The flashed vapor was passed through the superheater 50 wherein the temperature was raised to about 350° C. These superheated vapors were then passed through the reactor 60 wherein the benzene hexachloride vapors were dehydrohalogenated to form trichlorobenzene, using an activated charcoal catalyst. The trichlorobenzene product was condensed at approximately 90° C. and recovered in the trichlorobenzene holdup drum 80.

A portion of the liquid phase in the knockout drum was circulated through a coke filter to remove quantities of coke which formed in the vaporization and the filtrate was returned to the melt pot. A sufficient quantity was circulated so as to hold the coke content of the liquid benzene hexachloride solution below about 4 weight percent.

The above run was continuously conducted for 55 hours. Thereafter, the apparatus was inspected and found to be essentially free of any coke deposition.

The average product recovered in the trichlorobenzene holdup drum had the following composition in percent by weight:

| | Percent |
|---|---:|
| 1,2,4-trichlorobenzene | 79 |
| 1,2,3-trichlorobenzene | 9 |
| Pentachlorocyclohexene | 3 |
| Dichlorobenzenes and tetrachlorobenzenes | 9 |

As is believed apparent from the foregoing, the use of high linear flow velocities and the vaporization of only a limited quantity of the benzene hexachloride per pass through a vaporizer, materially reduces coking of the benzene hexachloride and virtually eliminates accumulation of coke on the vaporizer walls. A protecting liquid film is continuously maintained on the vaporizer walls throughout the length thereof, and thus the benzene hexachloride vapors are prevented from direct contact with the vaporizer walls, which condition has been found to cause abnormal coke formation.

The recycle of relatively large quantities of molten benzene hexachloride through the vaporizer also permits continuous elimination of coke and catalyzing impurities such as iron so as to further reduce accumulation of coke in the vaporizer and so as to eliminate predehydrochlorination in the vaporizer section.

The high fluid-flow velocities possible when employing a high recycle ratio not only maintain the heat transfer characteristics of the vaporizer by preventing the formation of a heat insulating coke layer, but also improve the heat transfer characteristics of the system by reducing the liquid film heat transfer coefficient.

We claim:

1. In a process for the vapor phase dehydrochlorination of a polychlorocyclohexane compound in which said compound is vaporized prior to passing the same into a dehydrochlorination reaction zone, the improvement in the vaporization step comprising continuously passing said polychlorocyclohexane in a molten state through a continuous flow type vaporizer, vaporizing a limited quantity of said polychlorocyclohexane compound per pass through said vaporizer and recycling the unvaporized fraction thereof, the velocity of flow of said polychlorocyclohexane through said vaporizer having a value consistent with a Reynolds number of at least 2300 so as to maintain a continuous liquid film on the walls of said vaporizer thereby preventing direct contact of vapors with the walls so as to minimize decomposition of said compound, the vaporization of the polychlorocyclohexane per pass through said vaporizing being limited to between 0.1 percent and 20 percent by weight, based on the total weight of the polychlorocyclohexane.

2. The process of claim 1 wherein the vaporization of the polychlorocyclohexane is limited to between about 1 and 10 percent by weight per pass, based on the total weight of polychlorocyclohexane.

3. The process of claim 2 wherein a portion of the molten polychlorocyclohexane is passed through a filter to remove coke formed during said vaporization.

4. The process of claim 1 wherein said polychlorocyclohexane is benzene hexachloride.

References Cited in the file of this patent

UNITED STATES PATENTS

| | | |
|---|---|---|
| 1,642,098 | Bey | Sept. 13, 1927 |
| 1,920,122 | Chavanne | July 25, 1933 |
| 1,942,861 | Huster | Jan. 9, 1934 |
| 2,277,113 | Kimmel | Mar. 24, 1942 |
| 2,586,998 | Schlenz | Feb. 26, 1952 |
| 2,679,831 | Henkel | June 1, 1954 |

FOREIGN PATENTS

| | | |
|---|---|---|
| 955,816 | France | July 4, 1949 |

OTHER REFERENCES

Marks: "Mech. Engrs. Handbook," 5th edition, page 250, McGraw-Hill, 1951.

Journal of the Society of Motion Picture and Television Engineers, vol. 60, February 1953, pp. 106–109.